(12) United States Patent
Körzendörfer et al.

(10) Patent No.: US 7,495,197 B2
(45) Date of Patent: Feb. 24, 2009

(54) METHOD AND APPARATUS UTILIZING FIRST AND SECOND HEATING DEVICES FOR HEAT TREATING A FUEL ASSEMBLY CHANNEL WITH INDUCTION HEATING

(75) Inventors: Maximilian Körzendörfer, Forchheim (DE); Andreas Möckel, Grossenseebach (DE); Bernd Block, Erlangen (DE); Hans-Joachim Lippert, Höchstadt (DE)

(73) Assignee: Areva NP GmbH, Erlangen (DE)

( * ) Notice: Subject to any disclaimer, the term of this patent is extended or adjusted under 35 U.S.C. 154(b) by 61 days.

(21) Appl. No.: 11/646,952

(22) Filed: Dec. 28, 2006

(65) Prior Publication Data

US 2007/0131218 A1 Jun. 14, 2007

Related U.S. Application Data

(63) Continuation of application No. PCT/EP2005/006937, filed on Jun. 28, 2005.

(30) Foreign Application Priority Data

Jun. 28, 2004 (DE) .................... 10 2004 031 192

(51) Int. Cl.
   *H05B 6/10* (2006.01)
   *G21C 21/00* (2006.01)
   *C21D 9/08* (2006.01)
(52) U.S. Cl. ............... 219/632; 219/635; 219/656; 219/674; 266/129; 148/567; 148/574; 376/409
(58) Field of Classification Search .......... 219/632, 219/635–637, 643–646, 647, 651–656, 672, 219/674–677; 266/129; 376/409; 148/567, 148/574
See application file for complete search history.

(56) References Cited

U.S. PATENT DOCUMENTS

| 2,225,424 | A | * | 12/1940 | Schwarzkopf ............... 419/28 |
| 3,593,972 | A | | 7/1971 | Wehrle et al. |
| 4,142,713 | A | | 3/1979 | Nakasugi et al. |
| 4,718,949 | A | | 1/1988 | Takase et al. |
| 5,140,118 | A | | 8/1992 | Catanese et al. |
| 5,487,795 | A | * | 1/1996 | Kim et al. ................... 148/520 |
| 6,704,386 | B2 | | 3/2004 | Nakayama et al. |

* cited by examiner

FOREIGN PATENT DOCUMENTS

| DE | 35 04 031 A1 | 9/1985 |
| EP | 1 119 005 A1 | 7/2001 |
| GB | 2 118 573 A | 11/1983 |
| SU | 1 152 096 A | 4/1985 |

*Primary Examiner*—Philip H Leung
(74) *Attorney, Agent, or Firm*—Laurence A. Greenberg; Werner H. Stemer; Ralph E. Locher

(57) ABSTRACT

In a method for heat treating a fuel assembly channel made of zircaloy, the channel is continuously moved relative to a heat-treatment device and, longitudinal sections of it are heated to the beta phase range in an inductive heating zone. The longitudinal section of the channel heated in this manner is than cooled in a cooling zone to a temperature within an alpha phase range. The heat treatment is effected by at least two heating devices, which are spaced apart from one another, operate independently of each other, and each contain at least one induction coil and together form a heating zone. The channel section is first heated using a first heating device and then heat-treated using a second heating device which has less power and in that cooling is effected using a stream of inert gas applied to the outer surface of the channel.

20 Claims, 4 Drawing Sheets

METHOD AND APPARATUS UTILIZING FIRST AND SECOND HEATING DEVICES FOR HEAT TREATING A FUEL ASSEMBLY CHANNEL WITH INDUCTION HEATING

CROSS-REFERENCE TO RELATED APPLICATIONS

This is a continuing application, under 35 U.S.C. §120, of copending international application PCT/EP2005/006937, filed Jun. 28, 2005, which designated the United States; this application also claims the priority, under 35 U.S.C. §119, of German patent application DE 10 2004 031 192.7, filed Jun. 28, 2004; the prior applications are herewith incorporated by reference in their entirety.

BACKGROUND OF THE INVENTION

Field of the Invention

The invention relates to a method and apparatus for heat treating a fuel assembly channel or box made of a zirconium alloy, in particular of zircaloy. A fuel assembly channel constitutes the cladding of a fuel assembly in a boiling water reactor. In the course of irradiation in the reactor, the fuel assembly channel dimensions undergo changes, such as a change in length, deformation of the channels and widening of the channels. These changes in dimensions depend on the texture of the material which is produced during the sheet-metal manufacturing process. In fuel assembly channels, in order to improve the texture-dependent dimensional stability during operation in the reactor, the original sheet-metal texture is eliminated using a heat treatment in the course of the manufacturing process. In the process, the fuel assembly channel continuously moves through a heat-treatment apparatus and is, at the same time, heated in longitudinal sections to the beta phase range using an inductive heating zone encompassing the fuel assembly channel, and, after it leaves the heating zone, a longitudinal section heated in this manner is cooled in a cooling zone to a temperature in the alpha phase range. During this process, the crystallites are distributed in a crystallographically random manner on account of the elimination of the typical texture in the sheet-metal material. Heating usually takes place using an induction coil, cooling is effected using water or an inert gas.

SUMMARY OF THE INVENTION

It is accordingly an object of the invention to provide a method and an apparatus for heat treating a fuel assembly channel made of a zirconium alloy which overcome the above-mentioned disadvantages of the prior art methods and devices of this general type, which offer more variability in terms of heating and cooling the fuel assembly channel when carrying out the method. With the foregoing and other objects in view there is provided, in accordance with the invention, a method for heat treating a fuel assembly channel made of zircaloy. The method includes moving continuously the fuel assembly channel relative to a heat-treatment device resulting in longitudinal sections of the fuel assembly channel being heated to a beta phase range with an aid of an inductive heating zone encompassing the fuel assembly channel. The heat-treatment device contains at least first and second heating devices spaced apart from one another in a longitudinal direction of the fuel assembly channel, operate independently of each other, and each of the first and second heating devices has at least one induction coil and together form the inductive heating zone. A fuel assembly channel section entering the inductive heating zone is heated using the first heating device and then heat-treated using the second heating device having less power than the first heating device. Each of the longitudinal sections is cooled after leaving the inductive heating zone in a cooling zone to a temperature within an alpha phase range. The cooling to the alpha phase range is effected with an aid of a stream of inert gas applied to an outer surface of the fuel assembly channel.

The heat treatment is effected with the aid of at least two heating devices, which are spaced apart from one another in the longitudinal direction of the channel, operate independently of each other and each contain at least one induction coil. A channel section entering the heating zone is heated using a first heating device and then heat-treated using a second heating device which has less power than the first heating device.

Heating in two stages is advantageous because, as compared to the heat treatment using only one coil, it is possible to adjust the desired set temperature more exactly and to achieve greater variability in terms of the heat treatment. Preferably the first stage uses power control measures to achieve heating to near the set temperature within the beta-phase range. The second, more weakly dimensioned induction coil is then used for the remainder of the heating up to the set temperature. Owing to the fact that it is less powerful, the induction heat produced by the induction coil can be controlled more precisely such that the set temperature can be adjusted to exact and reproducible values.

On account of the geometry of the fuel assembly channel, its corner regions experience increased inductive coupling with the result that the corner regions are heated more strongly than the wall regions. If such an unevenly heated fuel assembly channel is cooled to within the alpha phase range, there is a risk that the corner regions and the wall regions will have different material parameters. The two-stage heating process according to the invention can prevent this. This is because a channel section with inhomogeneous temperature distribution leaving a first heating device has, during the passage through a second heating device, sufficient time to equalize the temperature in the circumferential, and if desired also in the longitudinal, direction, with the result that it has a uniform temperature after leaving the second heating device. Owing to the considerably lower induction, the effect of the corner regions becoming hotter is correspondingly low in the second heating device and is therefore noticeable only to a far lesser extent.

Another preferred variant of the heat treatment provides that the cooling of a channel section leaving a first heating device is slowed down in a controlled manner using a second heating device by supplying it with a correspondingly small amount of heat. Using a method embodiment of this type, it is possible, for example, to extend the residence time of a channel section in a temperature range of above approximately 630° C. in order to thereby achieve a targeted grain growth and an increase in secondary precipitations. Controlled cooling of this type is facilitated, or even made possible in the first place, if inert gas is used for cooling instead of water. Together with the two-stage heat treatment, various possibilities ensue with respect to the controlled manner in which, first, heat is introduced and, second, heat is extracted. For instance, very fine intermetallic phases or secondary phases, which form in the event of rapid cooling, are not always expedient. If the residence time of a fuel assembly channel in the boiling water reactor is very long, which is the case in the event of high burn-up, the phases are rather unfavourable, because they lead to an increase in uniform corrosion.

From a control engineering standpoint, the manner in which the method is carried out is optimized by the fact that a first heating device is controlled in terms of its power and a second heating device is controlled in terms of its temperature, the channel temperature being contactlessly measured, in particular with the aid of a two-color pyrometer or a quotient pyrometer.

The inert-gas cooling carried out in combination with a two-stage inductive heat treatment has the advantage that the surface of the fuel assembly channel does not tarnish or become covered by an oxide layer which has to be removed again in a complex manner after the heat treatment. In this context, it is advantageous if, during the heat treatment, an inert-gas blanket is maintained which extends in the longitudinal direction of the channel both across the heating zone and across the cooling zone.

In a particularly preferred method variant, the inert-gas blanket is maintained in a housing which moves in relation to the fuel assembly channel and encompasses the latter. The axial length of the inert-gas blanket here corresponds approximately to the length of the housing. The relative velocity between the fuel assembly channel and the heating and cooling zone, the length of the inert-gas blanket and the amount of inert gas supplied for cooling are here coordinated such that a channel region leaving the inert-gas blanket has a temperature which is below the tarnishing temperature of the particular channel material used. It is also conceivable that the entire fuel assembly channel is disposed in a chamber in which the inert-gas blanket is maintained across the entire length of the fuel assembly channel.

An additional possibility to individually control the cooling of the fuel assembly channel provides that, besides inert-gas cooling, additional cooling takes place in the cooling zone with the aid of a heat sink, which surrounds the fuel assembly channel and is cooled using a fluid, such as water. In order to avoid oxidation of the internal surface of the fuel assembly channel during the heat treatment, an inert-gas atmosphere is maintained therein. In a further preferred way to carry out the method, the fuel assembly channel is held stationary during the heat treatment, and the heating and cooling zones are moved in the longitudinal direction of the channel. In this way, the overall height of an apparatus is reduced.

An apparatus solving the problem addressed in the introduction contains a heating zone having at least one first heating device and at least one second heating device downstream of the former in the processing direction, the heating devices having in each case at least one induction coil encompassing the fuel assembly channel, and a first heating device being more powerful than a second heating device. The apparatus furthermore contains a cooling device which is disposed at an axial spacing from the heating zone, forms a cooling zone and comprises at least one nozzle that can be used to pass a stream of inert gas onto the entire outer surface of a fuel assembly channel.

The housing forms a support for the at least one induction coil and for the at least one inert-gas nozzle and forms an outer boundary for an inert-gas blanket surrounding a fuel assembly channel. The inert-gas blanket is formed on account of the inert gas escaping from a nozzle.

Preferably, at least one induction coil is disposed on the outer circumference of the housing, the housing being made, at least in the region surrounded by the induction coil, of a material which is permeable to an electromagnetic field. Disposing an induction coil on the outer circumference of the housing is advantageous for space reasons. Additionally, there is less thermal influence on account of the high temperatures within the housing.

As already briefly outlined further above, two-stage heating is advantageous from a control engineering standpoint. Two induction coils configured for this purpose to be one behind the other are here insulated from each other by a shield disposed between them, in particular a flange made of an electrically conductive material encompassing the outer circumference of the housing.

Nozzles suitable for cooling have a multiplicity of outlet openings directed onto the outer surface of the fuel assembly channel. In order that the fuel assembly channel can be cooled uniformly in the circumferential direction, it is conceivable to provide an annular nozzle through which the fuel assembly channel passes when it is used. On account of the high temperatures within the housing, a metallic material lends itself as material for nozzles. In order to avoid inductive coupling to the induction coils, at least two nozzles are provided which are electrically insulated from one another in the circumferential direction of the housing. The use of a heat-resistant non-metallic material, such as ceramic, or of a sintered metal is also conceivable. No inductive coupling takes place in the case of these materials. The configuration of a nozzle inside a housing has the advantage that its outlet openings are disposed very close to the outer surface of a fuel assembly channel and that the latter can be cooled more effectively as a result. The inert gas streaming into the housing naturally must leave it again. To this end a discharge opening in the housing wall would be conceivable. However, this would result in, with respect to the circumference of a fuel assembly channel, non-uniform flow conditions and therefore possibly non-uniform cooling rates. For this reason, a preferred embodiment provides that the housing has two end openings through which a fuel assembly channel passes when it is being used, the openings having a shape which complements the contour of the fuel assembly channel and having a clear width that is slightly larger than the width across flats of the fuel assembly channel. In this manner, a relatively large radial gap between the housing and the fuel assembly channel can be selected, via which the inert gas escapes to the outside. It is also possible to use radial gaps of different size to control at which end of the housing the larger amount of inert gas escapes.

Other features which are considered as characteristic for the invention are set forth in the appended claims.

Although the invention is illustrated and described herein as embodied in a method and an apparatus for heat treating a fuel assembly channel made of a zirconium alloy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
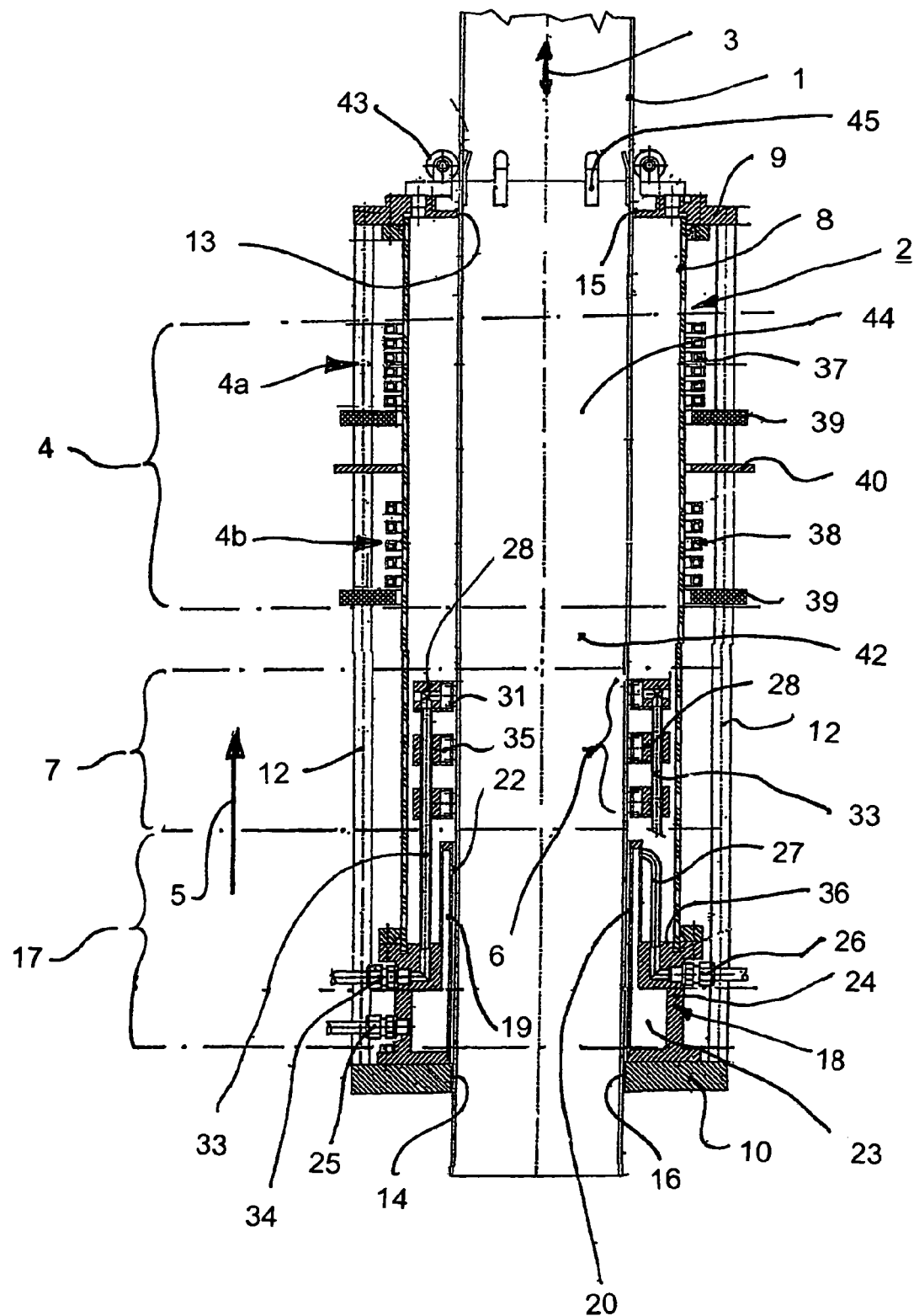
FIG. 1 is a diagrammatic, longitudinal sectional view through an apparatus according to the invention, and for reasons of simplicity only one housing surrounding a fuel assembly channel with components fastened to it is shown.
Figure 2:
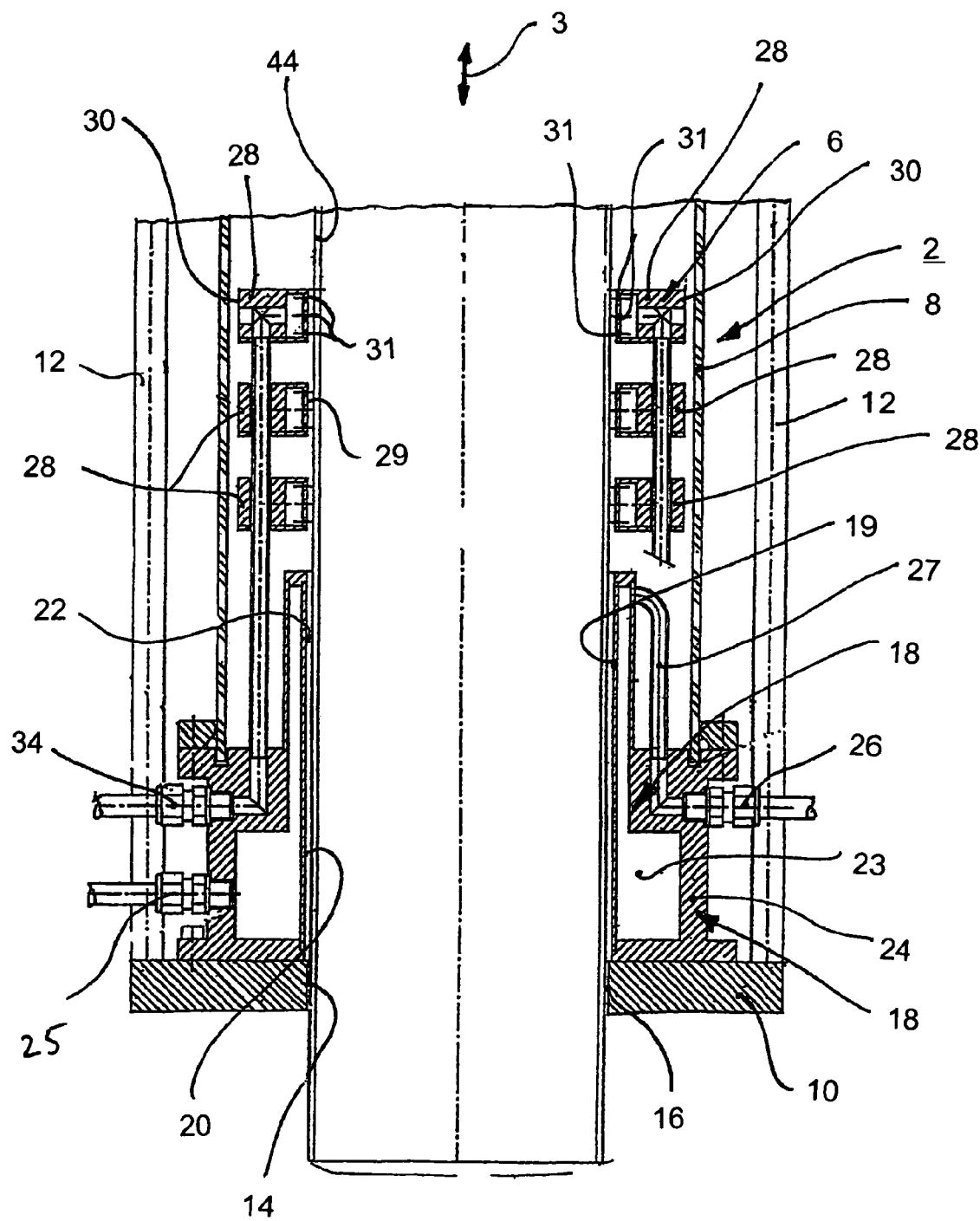
FIG. 2 is a diagrammatic, longitudinal sectional view of a lower part of the housing of FIG. 1.
Figure 3:
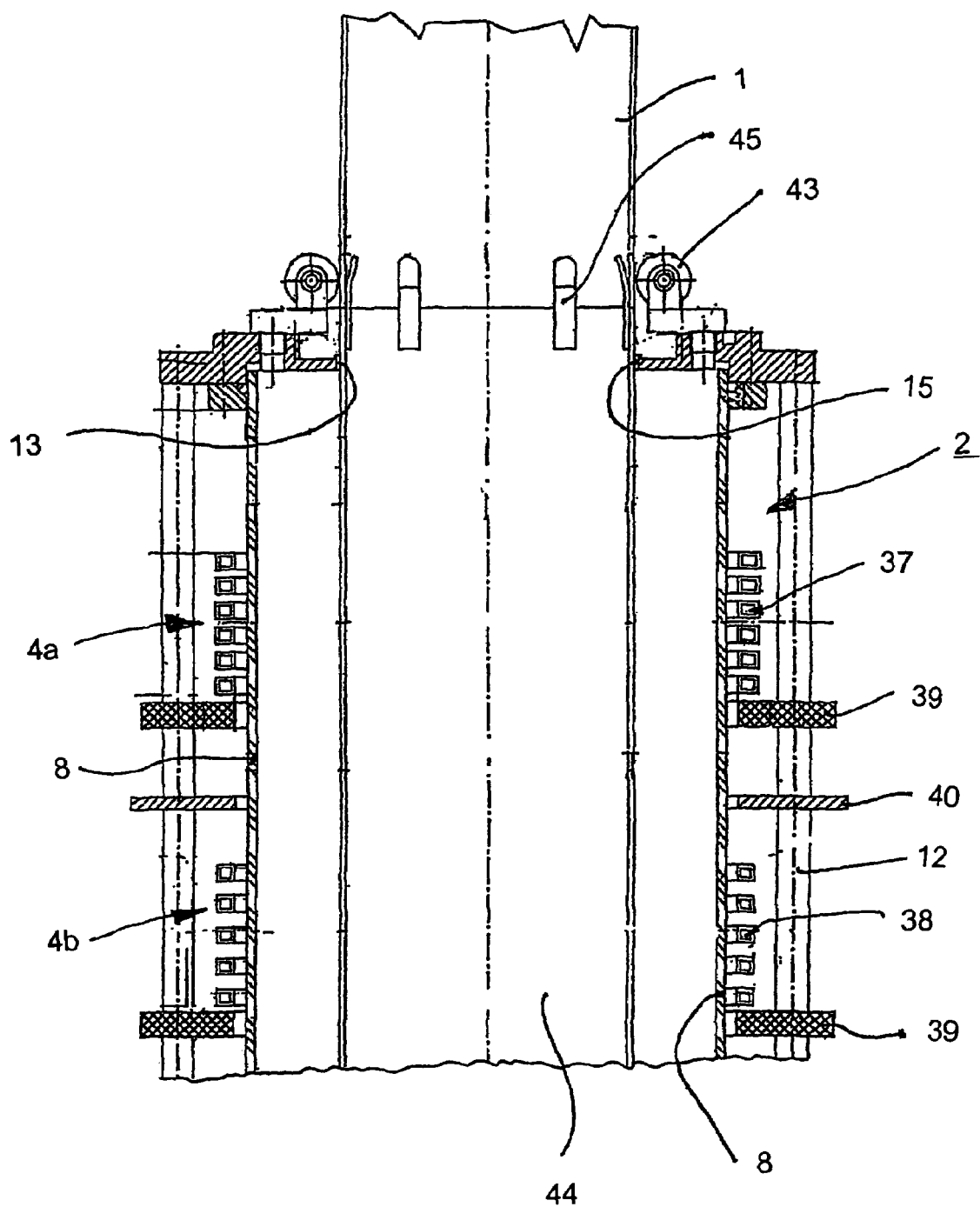
FIG. 3 is a diagrammatic, longitudinal sectional view of an upper part of the housing of FIG. 1.
Figure 4:
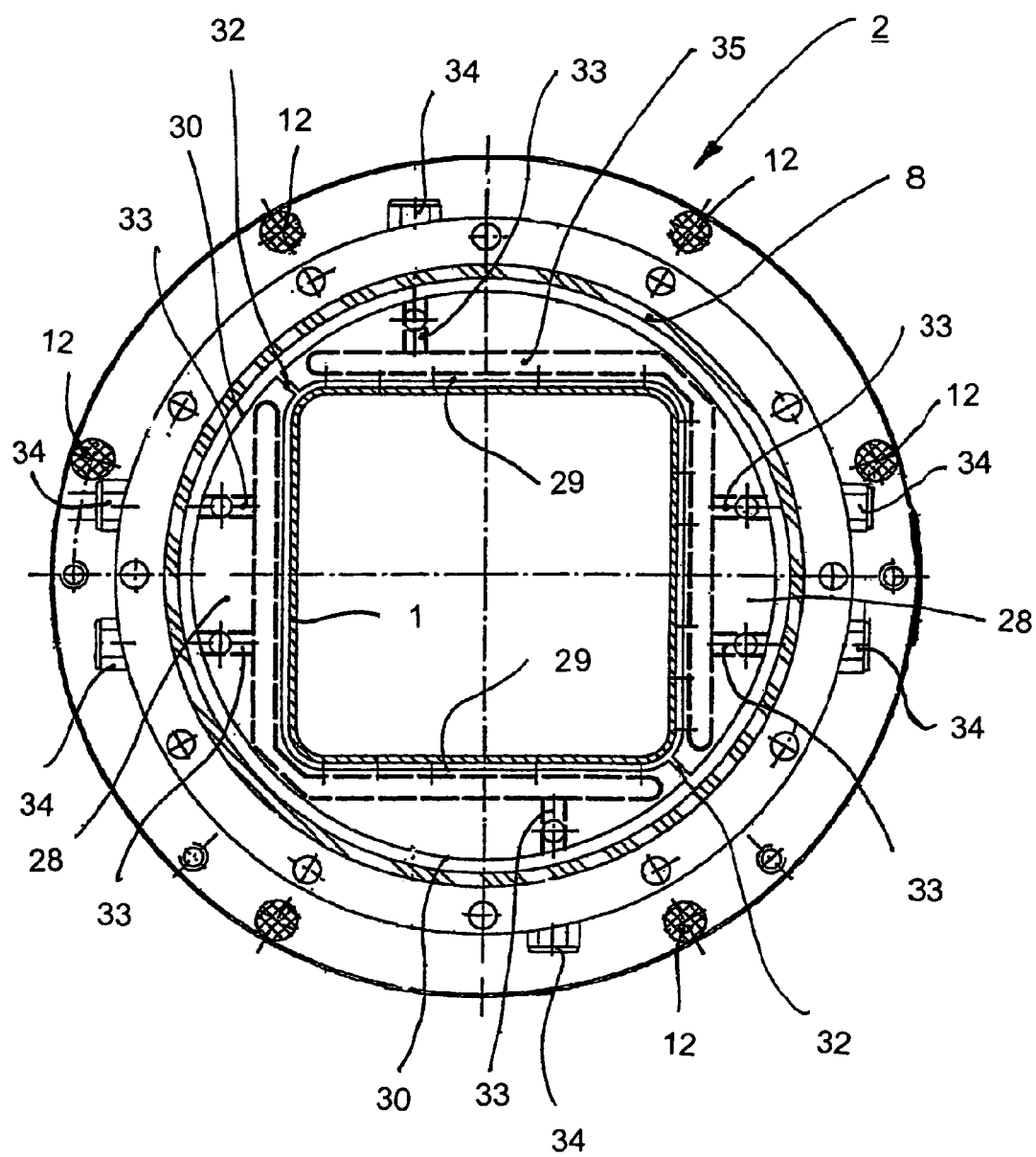
FIG. 4 is a diagrammatic, cross-sectional view taken along the line IV-IV shown in FIG. 1.

Referring now to the figures of the drawing in detail and first, particularly, to FIGS. 1-4 thereof, there is shown an apparatus for heat treating a fuel assembly channel or box 1. The apparatus contains a housing 2, which is carried vertically, or in a longitudinal direction 3 of the channel, on a non-illustrated frame, a heating zone 4 having a first heating device 4a and a second heating device 4b and a nozzle configuration 6 forming a first cooling zone 7. The housing 2 contains a cylinder made of glass, that is to say of a material permeable to electromagnetic fields. The housing 2 furthermore contains an upper flange 9 and a lower flange 10, both flanges 9, 10 being approximately in the form of a circular disk and being linked via bars 12, which are disposed coaxially outside a cylinder 8. The flanges 9, 10 have in each case a central opening 13 and 14 respectively. The shape of the openings 13, 14 complements the contour of the fuel assembly channel 1, which passes through the openings during the heat treatment, leaving a radial gap 15 and 16 free. Below the first cooling zone 7, a second cooling zone 17 is provided which is formed by a water-cooled heat sink 18. The heat sink 18 is substantially a double-walled hollow cylinder whose inner wall 19 bounds a central opening 20 circumferentially. Its clear width is slightly larger than the width across flats of the fuel assembly channel 1 such that, during the heat treatment, a radial gap 22 between the components remains free. The inner wall 19 and an outer wall 24 enclose a cavity 23 between them. The lower section of the cavity 23 widens radially. In this region, the outer wall 24 of the heat sink 18 is also stronger and supports, at diametrally opposing locations, an inlet connection piece 25 and an outlet connection piece 26. The outlet connection piece 26 is connected to the upper end of the cavity 23 via a line 27.

The nozzle configuration 6 contains six nozzles 28 overall. In each case two of the nozzles are disposed on a radial plane of the housing 2 and each take up half the inner circumference of the housing 2. The faces, having inwardly facing outlet openings 31, of the nozzles 28 form an angle of approximately 90° and, during use, extend parallel to the outer surfaces of the fuel assembly channel 1. The outer faces 30 of the nozzles 28 are curved in the manner of a circle according to the inner surface of the housing. A space 32 is provided between two nozzles 28 disposed on a radial plane, that is to say the nozzles are electrically insulated from one another, such that no inductive coupling to an electromagnetic field of a heating zone 4a, 4b takes place. An inert gas, such as argon, is applied to the nozzles 28 via lines 33, which extend inside the housing 2 in the longitudinal direction of the channel. Each nozzle 28 has a dedicated line 33 and a connection piece 34, which is disposed in the lower part of the heat sink 18, assigned to it. The downstream ends of the lines 33 issue into a cavity 35 in the nozzles 28, which cavity is connected to the outlet openings 31.

The housing 2 is supported by the upper end on the upper flange 9 and by its lower end on a radial shoulder 36 of the heat sink 18, which is carried by the lower flange 10. In exemplary embodiments in which the heat sink 18 is not provided, a non-illustrated flange on which the housing 2 is supported by its lower side and which carries the connection pieces 34 is provided instead of the heat sink 18. The first heating device 4a contains an induction coil 37 and the second heating device 4b (which is downstream when viewed in the processing direction 5) contains an induction coil 38, whose windings coaxially surround the outer circumference of the housing 2. The induction coils 37, 38 have a coil former 39. An electromagnetic adapter in the form of a flange 40, which annularly surrounds the housing and is made of a metallic material, is provided between the first and second induction coils 37, 38.

For heat treating the fuel assembly channel 1, the housing 2, including the components attached thereto, is moved in the longitudinal direction 3 of the channel or in the processing direction 5 when the fuel assembly channel is stationary, for example upwards when the fuel assembly channel 1 is aligned vertically. Here, the velocity of the housing is approximately 100 to 300 mm/min, preferably 200 mm/min. Heating to the beta phase range is effected by the two heating devices 4a and 4b and by their induction coils 37 and 38, wherein the first induction coil 37 is the more powerful one and supplies the predominant portion of the necessary amount of heat. Pure power control is provided for the induction coil 37. The more weakly dimensioned induction coil 38 of the second heating zone 4b, on the other hand, is part of a temperature control loop. It is used to exactly select the treatment temperature to the value desired in each case. Here, while a channel section is passing through the second heating zone 4b, only a comparatively small amount of heat is supplied to a channel section. The temperature of a channel section leaving the first heating device is contactlessly determined using a non-illustrated two-color pyrometer. The control is adjusted such that a longitudinal section of the fuel assembly channel 1 passing through the heating zone 4 is heated to a temperature of approximately 1100° C. Once a fuel assembly channel has left the first heating device 4a, it first reaches the region defined by the axial spacing 42 between the heating zone 4 and the cooling zone 7. Thereafter, it passes into the cooling zone 7 where it cools down relatively quickly, depending on the intensity and a possible pre-cooling of the applied stream of inert gas. In the cooling zone 7, a longitudinal section (which is in the beta phase range) of the fuel assembly channel is cooled relatively slowly to a temperature within the alpha phase range, instead of quenching it with water, the stream of inert gas supplied via the nozzles 28 being adjusted such that a fuel channel section is cooled, during its passage through the cooling zone 7, at least at a quench rate dT/dt>10 K/s. The cooling is adjusted here using corresponding measurement of the supplied stream of inert gas, which is preferably between 0.010 and 0.080 kg/s, in particular 0.032 kg/s, and setting the relative velocity between the fuel assembly channel 1 and the housing 2 such that the fuel channel material is held briefly, such as a few seconds, at a temperature above approximately 630° C. in order to achieve a growth of the secondary phases which were originally precipitated in very fine form. The cooling is furthermore controlled such that a grain size of less than 100 µm is achieved. Finally, residual heat is extracted using the heat sink 18 of the second cooling zone 17, so that a channel section which leaves the housing 2 from below and is exposed to the atmosphere has a temperature below the tarnishing temperature (approximately 150° C.). An inert gas atmosphere is maintained in the interior of the fuel assembly channel 1 so that the inner surface of the fuel assembly channel is not oxidized during the heat treatment.

Guide rollers 43 acting together with the outer surface of the fuel assembly channel 1 are provided on top of the upper flange 9 to guide the housing on the fuel assembly channel 1. In order to ensure that the fuel assembly channel 1 is heat treated uniformly across its entire length, channel sections 44 used as inlet and outlet path are releasably plugged onto the upper and lower end face of the fuel assembly channel 1. To this end, tabs 45 projecting beyond the end face of the channel section 44 are integrally formed on the inner face of a channel section 44.

We claim:
1. A method for heat treating a fuel assembly channel made of zircaloy, which comprises the steps of;
moving continuously the fuel assembly channel relative to a heat-treatment device resulting in longitudinal sections of the fuel assembly channel being heated to a beta phase range with an aid of an inductive heating zone encompassing the fuel assembly channel, the heat-treatment device containing at least first and second heating devices spaced apart from one another in a longitudinal direction of the fuel assembly channel, operate independently of each other, and each of the first and second heating devices having at least one induction coil and together form the inductive heating zone, a fuel assembly channel section entering the inductive heating zone being heated using the first heating device and then heat-treated using the second heating device having less power than the first heating device;

cooling each of the longitudinal sections after leaving the inductive heating zone with a cooling device disposed at an axial spacing from said heating zone, in a cooling zone to a temperature within an alpha phase range; and effecting the cooling to the alpha phase range with an aid of a stream of inert gas applied to an entire outer surface of the fuel assembly channel.

2. The method according to claim 1, which further comprises:

using the first heating device to heat the fuel assembly channel to a temperature below a set temperature; and subsequently using the second heating device, being downstream from the first heating device, to supply an amount of heat still needed to reach the set temperature.

3. The method according to claim 2, which further comprises supplying a sufficient amount of heat to the fuel assembly channel section heated to the set temperature using the downstream second heating device for one of maintaining a channel section temperature and for decelerating a cooling rate.

4. The method according to claim 1, which further comprises:

controlling the first heating device in terms of its power;

controlling the second heating device in terms of its temperature; and measuring contactlessly a channel temperature.

5. The method according to claim 4, which further comprises taking the channel temperature with an aid of one of a two-color pyrometer and a quotient pyrometer.

6. The method according to claim 1, which further comprises maintaining an inert-gas blanket on the outer surface of the fuel assembly channel and extends in the longitudinal direction of the fuel assembly channel across the inductive heating zone and across the cooling zone.

7. The method according to claim 6, which further comprises maintaining the inert-gas blanket in a housing which moves in relation to the fuel assembly channel and coaxially encompasses the fuel assembly channel.

8. The method according to claim 7, which further comprises coordinating a relative velocity between the fuel assembly channel and the heating and the cooling zones, a length of the inert-gas blanket, and an amount of the inert gas supplied for cooling such that a channel region leaving the inert-gas blanket and the housing has a temperature which is below a tarnishing temperature of a channel material forming the fuel assembly channel.

9. The method according to claim 1, which further comprises, in addition to the inert gas for cooling, providing a heat sink for additional cooling of the fuel assembly channel in the cooling zone, the heat sink surrounding the fuel assembly channel and is cooled using water.

10. The method according to claim 1, which further comprises during the heat treating, maintaining an inert-gas atmosphere in an interior of the fuel assembly channel.

11. The method according to claim 1, which further comprises:

placing the fuel assembly channel in a stationary position during the heat treating; and moving the inductive heating zone and the cooling zone in the longitudinal direction of the fuel assembly channel.

12. The method according to claim 1, which further comprises providing a channel section used as inlet and outlet path and being releasably attached to both ends of the fuel assembly channel.

13. An apparatus for continuously heat treating a fuel assembly channel made of a zirconium alloy, the fuel assembly channel being moved relatively through the apparatus for heating to a beta phase range and subsequently cooled to an alpha phase range, the apparatus comprising:

at least one first heating device;

at least one second heating device disposed downstream of said first heating device in a processing direction, said first and second heating devices together forming a heating zone and having in each case at least one induction coil encompassing the fuel assembly channel, said first heating device being more powerful than said second heating device; and a cooling device disposed at an axial spacing from said heating zone, forming a cooling zone, and containing at least one nozzle for passing a stream of inert gas onto an entire outer surface of the fuel assembly channel.

14. The apparatus according to claim 13, wherein said first heating device is controlled in terms of its power and said second heating device is controlled in dependence on a temperature of the fuel assembly channel.

15. The apparatus according to claim 13, further comprising a substantially cylindrical housing having a width dimensioned such that said housing coaxially surrounds the fuel assembly channel with a radial spacing, and an interior for receiving the inert gas; and wherein said heating zone is disposed on said housing, and extends over a longitudinal section of said housing.

16. The apparatus according to claim 15, wherein said induction coil of at least one of said first and second heating devices is disposed on an outer circumference of said housing, and at least a region of said housing surrounded by said induction coil contains a material being permeable to a electromagnetic field produced by said induction coil.

17. The apparatus according to claim 13, further comprising an electrically conductive shield disposed between said first heating device and said second heating device.

18. The apparatus according to claim 15, wherein said at least one nozzle of said cooling device is one of at least two nozzles being electrically insulated from one another and disposed in a circumferential direction of said housing.

19. The apparatus according to claim 15, wherein said nozzle of said cooling device is disposed inside of said housing.

20. The apparatus according to claim 15, wherein said housing has two end openings formed therein and through which the fuel assembly channel passes, said end openings having a shape which complements a contour of the fuel assembly channel.

* * * * *